United States Patent [19]
Hara et al.

[11] Patent Number: 5,146,332
[45] Date of Patent: Sep. 8, 1992

[54] VIDEO SIGNAL DELAY CIRCUIT HAVING SELF ADJUSTING GAIN

[75] Inventors: Kenji Hara; Yoshio Wada, both of Yokohama, Japan

[73] Assignee: Kabushiki Kaisha Toshiba, Kanagawa, Japan

[21] Appl. No.: 678,311

[22] PCT Filed: Sep. 6, 1990

[86] PCT No.: PCT/JP90/01143

§ 371 Date: Apr. 26, 1991

§ 102(e) Date: Apr. 26, 1991

[30] Foreign Application Priority Data

Sep. 7, 1989 [JP] Japan .................. 1-230535

[51] Int. Cl.$^5$ ............................. H04N 5/18
[52] U.S. Cl. .................... 358/172; 358/171
[58] Field of Search ............... 358/171, 172, 174, 34; 377/63

[56] References Cited

U.S. PATENT DOCUMENTS

| | | | |
|---|---|---|---|
| 4,110,290 | 8/1978 | Wheeler | 358/172 X |
| 4,374,400 | 2/1983 | Holmes . | |
| 4,509,181 | 4/1985 | Sauer | 377/63 |
| 4,811,016 | 3/1989 | Millward et al. | 358/172 X |

FOREIGN PATENT DOCUMENTS

| | | |
|---|---|---|
| 0067709 | 12/1982 | European Pat. Off. . |
| 52-34641 | 3/1977 | Japan . |
| 58-3380 | 1/1983 | Japan . |
| 58-222676 | 12/1983 | Japan . |

Primary Examiner—Victor R. Kostak
Attorney, Agent, or Firm—Finnegan, Henderson Farabow, Garrett and Dunner

[57] ABSTRACT

A pedestal clamp circuit fixes the pedestal level of an input video signal to a predetermined voltage. A pulse signal inserting circuit inserts a pulse signal, having a predetermined peak value, in part of the video signal partially corresponding to the blanking period whose pedestal level is fixed by the pedestal clamp circuit. A CCD delay element delays the video signal, in the blanking period of which the pulse signal is partially inserted, by one horizontal period. A variable gain amplifier amplifies the video signal, which is delayed by the CCD delay element by one horizontal period. An automatic control loop detects the level of the pulse signal inserted in the video signal, thereby detecting the attenuation amount of the video signal attenuated by the CCD delay element, and controls the gain of the variable gain amplifier in accordance with the detected attenuation amount.

14 Claims, 3 Drawing Sheets

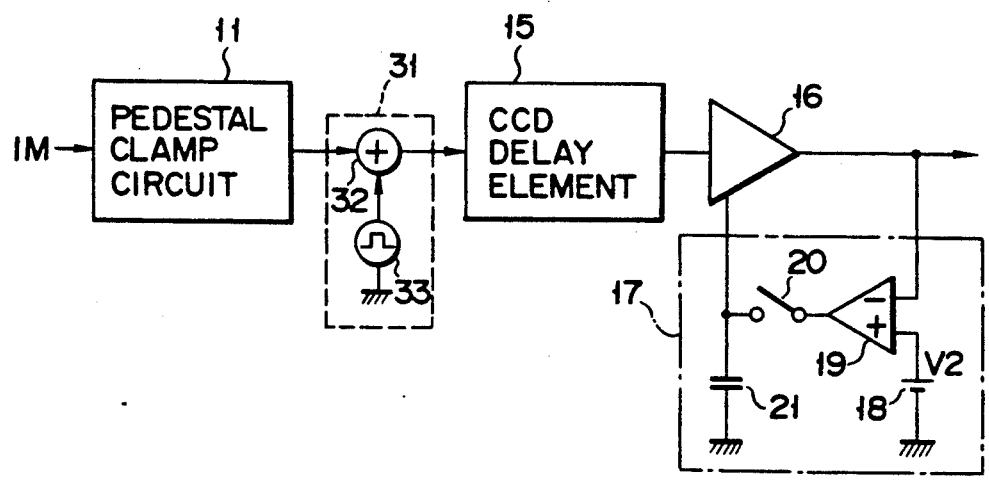
F I G. 3
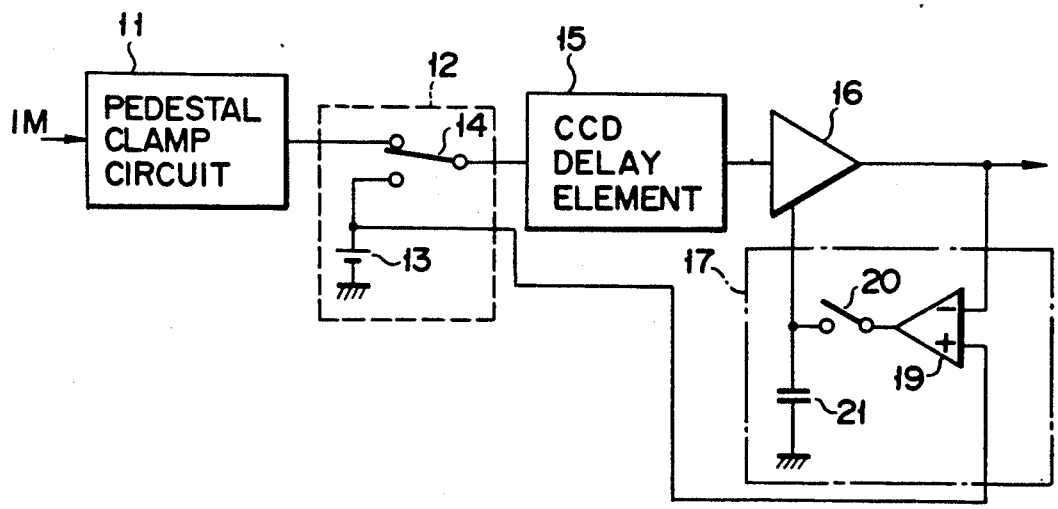
F I G. 4

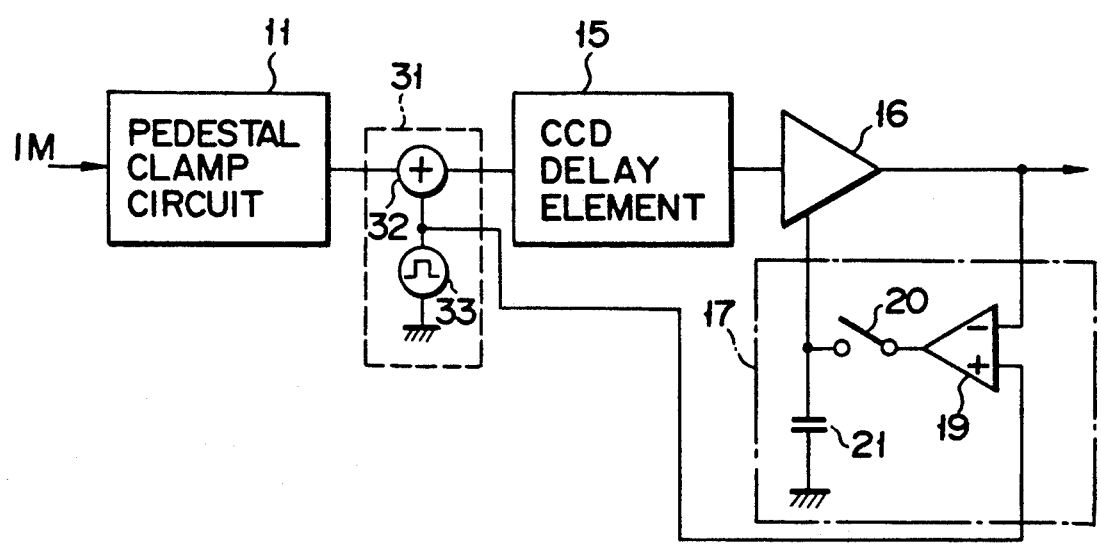
F I G. 5

VIDEO SIGNAL DELAY CIRCUIT HAVING SELF ADJUSTING GAIN

BACKGROUND OF THE INVENTION

1. Field of the Invention

The present invention relates to a video signal delay circuit, used in a television receiver or a video tape recorder, for delaying a delay signal by a predetermined period of time by, e.g., a charge coupled device-type delay element (to be referred to as a CCD delay element hereinafter) and, more particularly, to a video signal delay circuit capable of compensating for attenuation of a signal that has passed through a CCD delay element.

2. Description of the Related Art

A video signal delay circuit is used in a television receiver in order to delay a television video signal for one horizontal period. A conventional video signal delay circuit comprises a CCD deay element and an amplifier. More specifically, a video signal is supplied directly to the CCD delay element and is delayed by it for one horizontal period. The video signal delayed by the CCD delay element is supplied to the amplifier, and attenuation caused by the CCD delay element is compensated for by the amplifier. As an amplifier of this type, one having a constant gain is conventionally used.

An attenuation amount of a video signal caused by a CCD delay element varies depending on a manufacturing error of the CCD delay element, a change in operating condition of the element, and the like and is thus not constant. Therefore, when a video signal output from the CCD delay element is amplified using an amplifier having a constant gain, the gain of the overall video signal delay circuit is not constant.

It is an object of the present invention to provide a video signal delay circuit which can stabilize, when a video signal is delayed by a semiconductor delay element such as a CCD delay element, the gain of the overall video signal delay circuit even if the attenuation amount of the video signal fluctuates due to the manufacturing error of the semiconductor delay element or the change in operating condition of the element.

SUMMARY OF THE INVENTION

According to the present invention, there is provided a video signal delay circuit comprising a clamp circuit for fixing a pedestal level of an input video signal to a predetermined level, a pulse signal inserting circuit for inserting a pulse signal in a signal period of the video signal partially corresponding to a blanking period thereof, the pedestal level of the video signal being fixed by the clamp circuit, the pulse signal having a predetermined level with respect to the pedestal level, a semiconductor delay element for receiving the video signal in which the pulse signal is inserted by the pulse signal inserting circuit, and for delaying the video signal by a predetermined period of time, a variable gain amplifier, having a variable gain, for receiving an output signal from the semiconductor delay element, and for amplifying the output signal, and a gain control circuit for controlling the gain of the variable gain amplifier such that the pulse signal included in a signal output from the variable gain amplifier is set at a predetermined level with respect to the pedestal level.

According to the present invention, a pulse signal having a predetermined level is inserted in part of a vieo signal having, a fixed pedestal level, partially corresponding to the blanking period thereof. The gain of the variable gain amplifier is controlled by the gain control circuit such that the pulse signal included in the signal output from the variable gain amplifier becomes the predetermined level with respect to the pedestal level. As a result, even when the attenuation amount of the video signal attenuated by a semiconductor delay element is not ocnstant because of a manufacturing error or a change in temperature, the gain of the overall video signal delay circuit can be kept at a predetermined value.

BRIEF DESCRIPTION OF THE DRAWINGS

FIG. 3 is a block diagram showing the second embodiment of the present invention, FIG. 4 is a block diagram showing the third embodiment of the present invention, and FIG. 5 is a block diagram showing the fourth embodiment of the present invention.

DETAILED DESCRIPTION OF THE PREFERRED EMBODIMENT

Preferred embodiments of the present invention including the best mode of carrying out the invention will be described below with reference to the accompanying drawings.

Figure 1:
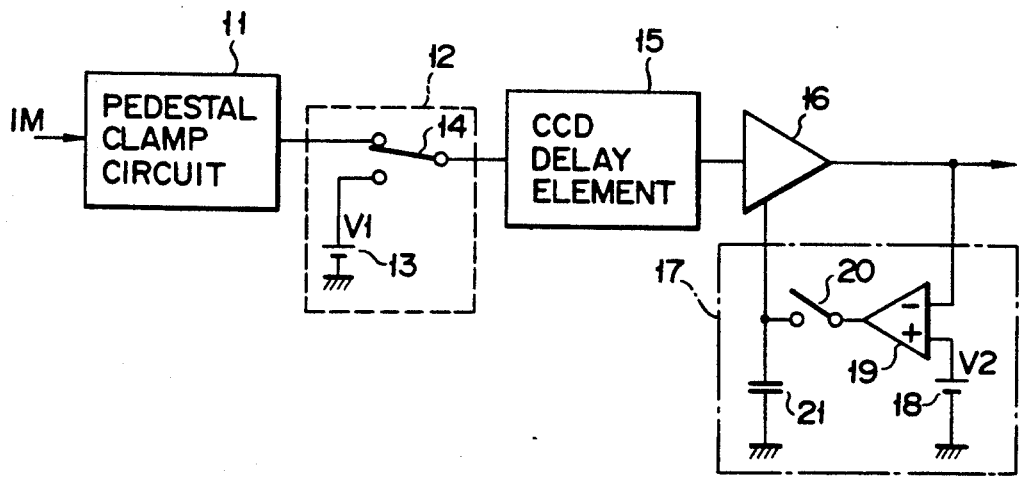
FIG. 1 is a block diagram showing the first embodiment of the present invention.
Figure 2:
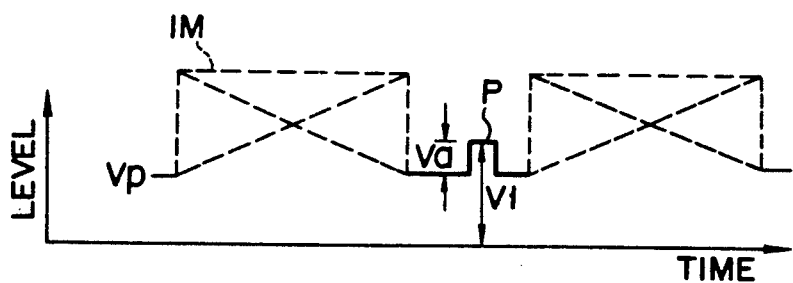
FIG. 2 shows an example of an operational waveform of a video signal delay circuit shown in FIG. 1.

FIG. 1 shows a video signal delay circuit used in, e.g., a television receiver, for delaying a video signal for one horizontal period (1H). A pedestal clamp circuit 11 fixes the pedestal level of an input video signal IM to a predetermined level. A pulse signal inserting circuit 12 inserts a reference pulse signal P in part of the video signal IM partially corresponding to the blanking period of the video signal whose pedestal level is fixed by the pedestal clamp circuit 11. More specifically, the pulse signal inserting circuit 12 comprises, e.g., a reference voltage source 13 and a switching circuit 14. During a signal period corresponding to part of the blanking period, the switching circuit 14 selects a reference voltage V1 from the reference voltage source 13 in place of the video signal IM output from the pedestal clamp circuit 11. When the reference voltage V1 is selected in this manner, the reference pulse signal P having the reference voltage V1 can be inserted in part of the video signal IM partially corresponding to the blanking period, as shown in FIG. 2. The reference voltage V1 has a level of Vp + Va which is the sum of a pedestal level Vp and a peak value Va. In this embodiment, a reference pulse signal which is positive with respect to the pedestal level Vp is inserted. However, a reference pulse signal which is negative with respect to the pedestal level Vp can be inserted instead.

A CCD delay element 15 delays the video signal IM, in which the reference pulse signal supplied from the pulse signal inserting circuit 12 is inserted, by a period of 1H. A variable gain amplifier 16 ampifies a signal output from the CCD delay element 15 and has a variable gain.

An automatic control loop 17 detects the level of the reference pulse signal P inserted in the video signal IM to detect the attenuation amount of the CCD delay element 15, and controls the gain of the variable gain amplifier 16 in accordance with the detected level. More specifically, the automatic control loop 17 comprises a differential amplifier 19, a switching circuit 20, and a capacitor 21. The differential amplifier 19 detects a difference between a reference voltage V2 supplied from the reference voltage source 18 and an output voltage of the variable gain amplifier 16. The switching circuit 20 is turned on in response to the reference pulse signal P inserted during, e.g., the blanking period, and fetches the output voltage of the differential amplifier 19. The capacitor 21 serves as a holding means to hold the output voltage of the differential amplifier 19, fetched through the switching circuit 20, for a period of 1H, and supplies it to the variable gain amplifier 16 as a control voltage.

The operation of the video signal delay circuit will be described with reference to the video signal waveform shown in FIG. 2.

The pedestal level Vp of the video signal IM supplied to the pedestal clamp circuit 11 is fixed to a predetermined voltage. This video signal IM having the fixed pedestal level Vp is supplied to the CCD delay element 15 through the switching circuit 14 and is delayed by a period of 1H. The switching circuit 14 is switched from the pedestal clamp circuit 11 side to the reference voltage source 13 side during part of the blanking period of the video signal IM, and the reference pulse signal P having a peak value Va is inserted in a signal period corresponding to the part of the blanking period. The video signal IM to which the reference pulse signal P is inserted is delayed by the CCD delay element 15 by a period of 1H and is suppied to the variable gain amplifier 16. The gain of the gain amplifier 16 is controlled by the automatic control loop 17 such that the reference pulse signal P has the predetermined peak value Va. More specifically, the differential amplifier 19 of the automatic control loop 17 detects an error voltage between the output voltage of the variable gain amplifier 16 and the reference voltage V2. The switching circuit 20 is turned on in response to the reference pulse signal P inserted during the blanking period of the video signal IM, and an error voltage between the voltage of the reference pulse signal P output from the differential amplifier 1 and the reference voltage V2 is extracted. The extracted difference voltage is held by the capacitor 21 for a period of 1H, and the held difference voltage is supplied to the variable gain amplifier 16 as the control voltage. The gain of the variable gain amplifier 16 is controlled so that the difference is compensated for in accordance with the supplied control voltage.

When the automatic control loop is set in a stable state, a following relation is obtained:

$$a \cdot V1 \cdot K = V2 \ldots \quad (1)$$

where $a$ is the transfer function of the CCD delay element 15 and K is the gain of the variable gain amplifier 16.

In this embodiment, the gain of the variable gain amplifier 16 is controlled in accordance with the attenuation amount of the reference pulse signal P included in the video signal. Therefore, even when the transfer function of the CCD delay element 15 fluctuates due to the manufacturing error or a change in operating conditions of the element, the output level of the variable gain amplifier 16 can be kept at a predetermined value V2, thereby keeping the gain of the overall video signal delay circuit constant. In addition, the gain of the variable gain amplifier 16 is automatically controlled in units of horizontal periods of the video signal. Therefore, the gain of the overall video signal delay circuit can be kept constant even when, e.g., a manufacturing error occurs in the CCD delay element 15 or when the element operating conditions, such as an operating power source voltage Vcc (not shown) or the temperature, varies.

FIG. 3 shows the second embodiment of the present invention. The same reference numerals in FIG. 3 denote the same or identical parts as in FIG. 1.

The second embodiment is different from the first embodiment only in the design of a pulse signal inserting circuit 31. The pulse signal inserting circuit 31 comprises an adder 32 and a pulse generator 33. One input terminal of the adder 32 is connected to the output terminal of a pedestal clamp circuit 11, and the other input terminal thereof is connected to the pulse generator 33. The pulse generator 33 generates a reference pulse signal P having a predetermined peak value Va in correspondence with part of the blanking period. The reference pulse signal P generated by the pulse generator 33 is added in part of the blanking period of a video signal IM supplied from a pedestal clamp circuit 11, as shown in FIG. 2. After the reference pulse signal P is added to the video signal IM, the video signal IM is sequentially supplied to a CCD delay element 15 and a variable gain amplifier 16. The gain of the variable gain amplifier 16 is controlled by an automatic control loop 17 in the same manner as in the first embodiment.

Therefore, the same effect as in the first embodiment can be obtained in the second embodiment.

FIGS. 4 and 5 respectively show the third and fourth embodiments of the present invention. The same reference numerals as in FIGS. 1 and 3 denote the same or identical parts in FIG. 4 and 5.

In the first and second embodiments, the differential amplifier 19 is connected to the reference power source 18. However, in the third embodiment, the positive input terminal of a differential amplifier 19 is connected to the reference voltage source 13 in place of the reference voltage source 18, as shown in FIG. 4. In the fourth embodiment, the positive input terminal of a differential amplifier 19 is connected to a pulse generator 33, as shown in FIG. 5.

With this arrangement, the above equation (1) becomes:

$$a \cdot K = 1 \quad (1)$$

and the variable factors in the video signal delay circuit can be reduced compared to the first and second embodiments. Therefore, the gain of the overall video signal delay circuit can be kept stabler against variations in operating power source voltage Vcc and in temperature.

Various changes and modifications can be made within the spirit and scope of the invention.

INDUSTRIAL APPLICABILITY

As described above, according to the video signal delay circuit of the present invention, even when the attenuation amount of the video signal is not constant because of a manufacturing error of the CCD delay element or of a change in element operating conditions, the gain of the overall video sgnal delay circuit can be kept at a predetermined value. As a result, the present invention can be suitably applied to a television receiver or a video tape recorder.

We claim:

1. A video signal delay circuit comprising:
a first circuit for fixing a pedestal level of a video signal to a predetermined level;
an inserting circuit for inserting a pulse signal in a signal period of the video signal partially corresponding to a blanking period thereof, the pulse signal having a predetermined level with respect to the pedestal level;
a delay element for receiving the video signal in which the pulse signal is inserted by said inserting circuit, and for delaying the video signal by a predetermined period of time;
a variable gain amplifier for receiving an output signal from said semiconductor delay element, and for amplifying the output signal to generate an amplified signal having a pulse corresponding to the pulse inserted by the inserting circuit; and
a gain control circuit, responsive to the amplified signal, for controlling the gain of said variable gain amplifier such that the pulse in the amplified signal is set at a predetermined level with respect to the pedestal level.

2. A video signal delay circuit according to claim 1, wherein said inserting circuit comprises a reference power source and switching means for switchin between said reference power source and the video signal during the blanking period of the video signal.

3. A video signal delay circuit according to claim 1, wherein said inserting circuit comprises a pulse generator for generating a pulse signal corresponding to the blanking period of the video signal, and adding means for adding the pulse signal in a signal period of the video signal.

4. A video signal delay circuit according to claim 1, where said delay element comprises a charge-coupled device.

5. A video signal delay circuit according to claim 1, wherein said gain control cirucit comprises a differential amplifier for obtaining a difference voltage between an output voltage of said variable gain amplifier and a reference voltage, a switching circuit for extracting the difference voltage in correspondence with the pulse signal inserted in the video signal, and a holding circuit for supplying the difference voltage, extracted through said switching circuit, to said variable gain amplifier as a control signal.

6. A video signal delay circuit according to claim 1, wherein said inserting circuit comprises a reference power source; and switching means for switching between said reference power source and the video signal during the blanking period of the video signal, and said gain control circuit comprises a differential amplifier for obtaining a difference voltage of an output voltage from said variable gain amplifier and a reference voltage supplied from said reference power source, a switching circuit for extracting the difference voltage in correspondence with the pulse signal inserted in the video signal, and a holding circuit for supplying the difference voltage, extracted through said switching circuitt, to said variable gain amplifier as a control signal.

7. A video signal delay circuit according to claim 1, wherein said inserting circuit comprises a pulse generator for generating a pulse signal corresponding to the blanking period of the video signal; and adding means for adding the pulse signal generated by said pulse generator in the blanking period of the video signal, and said gain control circuit comprises a differential amplifier for obtaining a difference voltage between an output voltage of said variable gain amplifier and the pulse signal supplied from said pulse generator; a switching circuit for extracting the difference voltage in correspondence with the pulse signal inserted in the video signal; and a holding circuit for supplyin the difference voltage, extracted through said switching circuit, to said variable gain amplifier as a control signal.

8. A circuit for delaying a video signal having a pedestal level comprising:
an inserting circuit for inserting a pulse into the video signal during a blanking period of the video signal the inserting circuit including
a reference power source, and
switching means for switching between the reference power source and the video signal during the blanking period of the video signal;
a delay element for receiving the video signal in which the pulse signal is inserted by the inserting circuit, and for delaying the video signal by a predetermined period of time;
a variable gain amplifier for receiving an output signal from the semiconductor delay element, and for amplifying the output signal to generate an amplified signal having a pulse corresponding to the pulse inserted by the inserting circuit; and
a gain control circuit, responsive to the amplifier signal, for controlling the gain of the variable gain amplifier such that the pulse in the amplified signal is set at a predetermined level with respect to the pedestal level, the gain control circuit including
a differential amplifier for obtaining a difference voltage of an output voltage from the ariable gain amplifier and a reference voltage supplied from the reference power source,
a switching circuit for extracting the difference votlage in correspondence with the pulse signal inserted in the video signal, and
a holding circuit for supplying the difference voltage, exracted through the switching circuit, to the variable gain amplifier as a control signal.

9. A circuit for delaying a video signal having a pedestal level comprising:
an inserting circuit for inserting a pulse into the video signal during a blanking period of the video signal, the inserting circuit including
a pulse generator for generating a pulse signal corresponding to the blanking period of the video signal, and
adding means for adding the pulse signal generated by the pulse generator in the blanking period of the video signal;
a delay element for receiving the video signal in which the pulse signal is inserted by the inserting circuit, and for delaying the video signal by a predetermined period of time;
a variable gain amplifier for receiving an output signal from the semiconductor delay element, and for amplifying the output signal to generate an amplified signal having a pulse corresponding to the pulse inserted by the inserting circuit; and
a gain control circuit, responsive to the amplified signal, for controlling the gain of the variable gain amplifier such that the pulse in the amplified signal is set at a predetermined level with respect to the pedestal level, the gain control circuit including
a differential amplifier for obtaining a difference voltage between an output voltage of the variable gain amplifier and the pulse signal suuplied from the pulse generator, a switching circuit for extracting the difference voltage in correspondence witht he pulse signal inserted in the video signal, and a holding circuit for supplying the difference voltage, extracted through the siwtching circuit, to the variable gain amplifier as a control signal.

10. A circuit adapted for receiving a first signal having a blanking period comprising:

first means for generating a second signal by inserting a pulse into the first signal during the blanking period;

second means for generating a third signal by delaying the second signal;

third means, having a control input, for generating a fourth signal by amplifying the third signal with a gain determined by a signal on the control input; and fourth means, responsive to the fourth signal, for generating a fifth signal and for sending the fifth signal to the control input in synchronism with inserting of the pulse by the first means.

11. A circuit according to claim 10, wherein the first means includes a reference voltage source; and means for switching between the reference voltage source and the first signal.

12. A circuit according to claim 10, wherein the first means includes means for adding the pulse to the first signal.

13. A circuit according to claim 10, wherein the second means includes a charge-coupled device.

14. A circuit according to claim 10, wherein the fourth means includes means for obtaining a difference voltage between the fourth signal and a reference voltage; and a holding circuit for supplying the difference voltage to the control input.

* * * * *